(12) United States Patent
Catsifas et al.

(10) Patent No.: US 11,367,132 B1
(45) Date of Patent: Jun. 21, 2022

(54) SYSTEMS AND METHODS FOR GENERATING PERSONALIZED ACCOUNTING ANALYSIS VIDEOS

(71) Applicant: United Services Automobile Association (USAA), San Antonio, TX (US)

(72) Inventors: Christine Catsifas, San Antonio, TX (US); Scott Pollock, San Antonio, TX (US); Marcos Rosenburg, San Antonio, TX (US); Vikram Parekh, San Antonio, TX (US); Marty Lee Mendivil, San Antonio, TX (US); Staci Rohde, La Vernia, TX (US); Evan Sobinovsky, San Antonio, TX (US); Mikel Van Cleve, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 529 days.

(21) Appl. No.: 15/965,384

(22) Filed: Apr. 27, 2018

Related U.S. Application Data

(60) Provisional application No. 62/491,987, filed on Apr. 28, 2017.

(51) Int. Cl.
*G06Q 40/00* (2012.01)
*G06Q 40/02* (2012.01)
*G06F 16/245* (2019.01)

(52) U.S. Cl.
CPC .......... *G06Q 40/02* (2013.01); *G06F 16/245* (2019.01)

(58) Field of Classification Search
CPC ........ G06Q 40/00; G06Q 40/02; G06F 16/24; G06F 16/245
USPC .................................................. 705/4, 35–45
See application file for complete search history.

(56) References Cited

U.S. PATENT DOCUMENTS

| 8,433,650 B1 | 4/2013 | Thomas | |
|---|---|---|---|
| 2014/0156501 A1* | 6/2014 | Howe | G06Q 40/025 705/38 |
| 2015/0296240 A1* | 10/2015 | McDonough | H04N 21/4886 725/31 |
| 2016/0132847 A1* | 5/2016 | Sarris | G06Q 20/1085 705/42 |
| 2018/0075527 A1* | 3/2018 | Nagla | G06Q 40/025 |

OTHER PUBLICATIONS

U.S. Appl. No. 14/752,386, filed Jun. 26, 2015, Burks et al.

* cited by examiner

*Primary Examiner* — Rajesh Khattar
*Assistant Examiner* — Mohammed H Mustafa
(74) *Attorney, Agent, or Firm* — Fletcher Yoder, P.C.

(57) ABSTRACT

A system for generating video content may include a bank database that has a first set of data associated with an account status of an individual. The system may also include a credit provider database that includes a second set of data associated with a credit status of the individual and at least one processor. At least one processor may receive an indication that the credit status of the individual has changed, retrieve the first set of data from the bank database and the second set of data from the credit provider database, generate a personalized financial video associated with the individual based on the first set of data and the second set of data, and transmit the personalized financial video to a computing device associated with the individual.

20 Claims, 3 Drawing Sheets

SYSTEMS AND METHODS FOR GENERATING PERSONALIZED ACCOUNTING ANALYSIS VIDEOS

CROSS-REFERENCE TO RELATED APPLICATION

This application claims priority to and the benefit of U.S. Provisional Application No. 62/491,987 entitled "SYSTEMS AND METHODS FOR GENERATING PERSONALIZED ACCOUNTING ANALYSIS VIDEOS," filed Apr. 28, 2017, which is hereby incorporated by reference in its entirety for all purposes.

BACKGROUND

The present disclosure relates generally to generating personalized videos related to an individual's financial status. More specifically, the present disclosure relates to generating visualizations depicted via an electronic display to assist individuals in improving their respective financial statuses.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

As financial databases of different organizations become more readily available and accessible for queries, systems may retrieve account status information for different individuals from different organizations at various times. To better inform individuals with regard to improving their respective financial statuses, it may be beneficial to leverage the available data and present an individual with personalized information related to improving his financial status or achieving his financial goals.

BRIEF DESCRIPTION

In one embodiment, a system for generating video content may include a bank database that has a first set of data associated with an account status of an individual. The system may also include a credit provider database that includes a second set of data associated with a credit status of the individual and at least one processor. The at least one processor may receive an indication that the credit status of the individual has changed, retrieve the first set of data from the bank database and the second set of data from the credit provider database, generate a personalized financial video associated with the individual based on the first set of data and the second set of data, and transmit the personalized financial video to a computing device associated with the individual.

In another embodiment, a non-transitory computer-readable medium may include computer-executable instructions that, when executed by at least one processor, cause the at least one processor to receive an indication associated with a credit score change of an individual, query a bank database for a first set of data associated with an account status of the individual, query a credit provider database for a second set of data associated with a credit status of the individual, generate a personalized financial video that may include one or more animations that convey one or more recommended actions to improve a credit score of the individual, and send a notification to a computing device associated with the individual, such that the notification enables the computing device to access the personalized financial video.

In yet another embodiment, a method for generating a video may include using at least one processor to receive an indication associated with a credit score change of an individual, query a bank database for a first set of data associated with an account status of the individual, query a credit provider database for a second set of data associated with a credit status of the individual, and generate a personalized financial video that may include one or more animations that convey one or more recommended actions to improve a credit score of the individual. The method may then include sending, via the at least one processor, a notification to a computing device associated with the individual, such that the notification may enable the computing device to access the personalized financial video

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
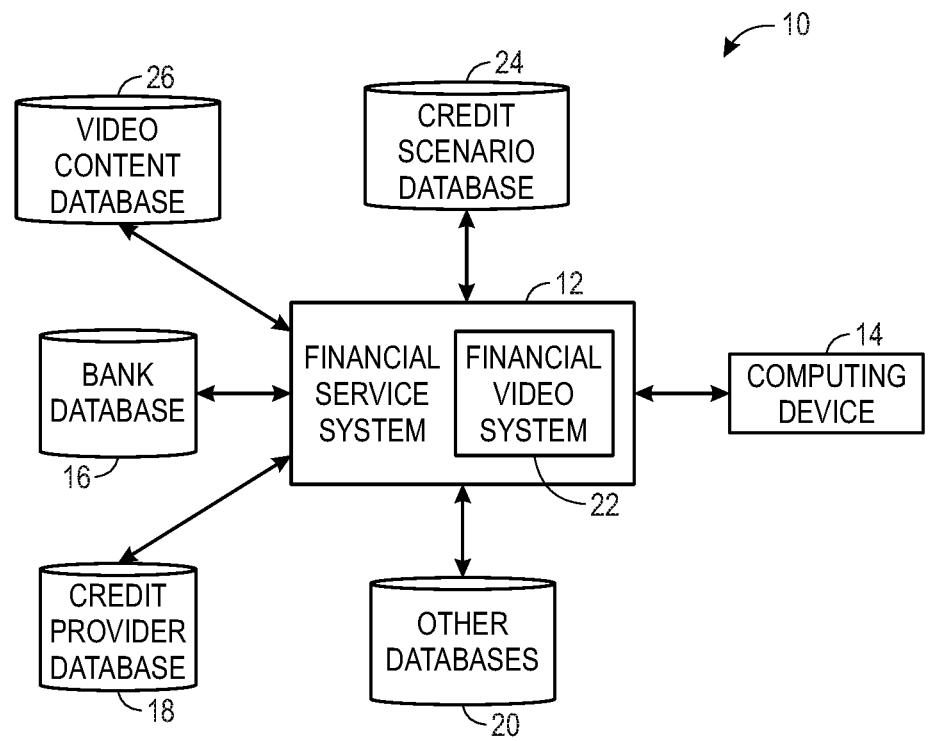
FIG. 1 illustrates a block diagram of a video generation system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, although current status information regarding an individual's financial data is useful, it may be useful to receive personalized information that includes instructions related to achieving certain financial goals of an individual or to generally improve the financial status (e.g., credit score) associated with an individual. In certain embodiments, a financial video system may receive identification from an individual via an input device of any suitable computing device and use the identification information to retrieve account information regarding the individual. The account information may include data acquired from one or more databases via a network connection or the like. The databases may include financial data acquired by banking institutions, insurance institutions, credit institutions, and other financial institutions.

As such, the financial video system may have access to current financial data related to the individual, such as current account balances, current credit scores, and the like. In addition, the account information may include credit goals, account savings goals, trigger conditions for credit alerts, trigger conditions for account alerts, and the like. In one embodiment, based on the goals indicated by the account information and the current financial data related to the individual, the financial video system may generate a video message personalized for the individual that corresponds to the identification. The video message may be generated using visualizations that greet the individual by the individual's name, provide current status information regarding the current account balances and credit scores of the individual, present information related to impacts or consequences related to the current account balances and/or current credit scores, and provide one or more suggested actions for the individual to perform to help the individual to achieve his or her goals.

By way of introduction, FIG. 1 illustrates a video generation system 10 that includes certain components, electronic devices, and a collection of electronic devices that enable a financial video system to perform the methods described herein. As shown in FIG. 1, the video generation system 10 may include a financial service system 12 that may be communicatively coupled to a computing device 14. The financial service system 12 and the computing device 14 may be any suitable computing device, such as a mobile computing device (e.g., smart phone, tablet), a laptop computer, a personal computer, and the like. Additional details with regard to components that make up the financial service system 12 and the computing device 14 will be discussed below with reference to FIG. 2.

The financial service system 12 may correspond to a computing device, a server, or a collection of computing devices and/or servers that manages operations of a financial organization, such as a bank, credit provider, insurance provider, or the like. Generally, the financial service system 12 may provide account information, financial services (e.g., loan application, credit monitoring), and the like concerning an individual or account holder. To provide these services, the financial service system 12 may acquire information from various data sources. For example, the financial service system 12 may be communicatively coupled to a bank database 16, a credit provider database 18, and other databases 20.

The bank database 16 may include account information for individuals, companies, organizations, and the like. The account information may be related to account balances, spending trends, deposit amounts, income, debts, mortgages, and the like. The credit provider database 18 may include information regarding a credit status of an individual or organization. For instance, the information of the credit provider database 18 may include an available credit line, a credit score, outstanding debts, and the like. In addition, the credit provider database 18 may include a collection of actions that are related to improving a credit score, a credit standing, or the like.

In certain embodiments, the bank database 16 and/or the credit provider database 18 may include identification information regarding the client. For instance, the identification information may include name information, address information, and other information that may characterize one or more interests regarding the client. The other information may include details regarding interests of the client, such as a favorite sports team, hobbies of interest to the client, organizations that represent the client's affiliations, publications that the client may review, and the like. The other information regarding the client may provide additional context and details that may provide more personalized video content.

The other databases 20 may include information related to current financial environment. That is, the other databases 20 may include data regarding the economy, interest rates, stock market prices, and the like. In certain embodiments, the other databases 20 may include a collection of information from electronic news sources, such as Internet websites, news organizations, financial reporting agencies, and the like, that may assist the financial service system 12 to manage funds that are retained by the respective financial organization.

The computing device 14 may correspond to a device that is used by a client of the financial organization. The client may use the computing device 14 to access his or her financial information that may be stored on bank database 16, the credit provider database 18, or the like via the financial service system 12. As such, the client may use the computing device 14 to interact with the financial service system 12, to manage his/her account via the financial service system 12, seek financial services (e.g., a loan) from the financial service system 12, and the like.

The financial service system 12 may include a financial video system 22. The financial video system 22 may be a software component executed by the financial service system 12 or a separate special-purpose computing device that generates personalized videos as described herein. By employing the financial video system 22 to coordinate the techniques described in the present disclosure, the financial video system 22 may efficiently coordinate the collection of personal data regarding an individual, the account data regarding the individual, non-personal data used to generate the video, and the like to generate the personalized video in a timely fashion to provide a user with the video nearly instantaneously after receiving a request for the video.

As will be described in more detail below, in certain embodiments, the financial video system 22 may receive an indication regarding a change to a financial status associated with a client of an organization. For example, the financial status may be related to a change in a client's credit score that is greater than some threshold amount, a withdrawal from the client's bank account that exceeds a threshold amount, a request for credit monitoring, a request for credit consolidation, and the like. After receiving the indication, the financial video system 22 may query the bank database 16 for account information regarding the client to determine a current account status for the client, query the credit provider database 18 to determine a current credit status for the client, and determine a credit scenario for the client.

The credit scenario may include a general summary of the client's credit status with respect to his account status. In some embodiments, the credit scenario may also be characterized by a goal, such as a desired credit score, a desired savings amount, or the like. In certain embodiments, a variety of different credit scenarios may be stored in a credit scenario database 24. In certain embodiments, the financial video system 22 may receive data from a number of clients and categorize each of the client's relationships between his account status, his credit status, and his goals as a respective credit scenario. Based on the account status, the credit status, and the goals, the financial video system 22 may determine a course of actions or suggested actions for the client to perform to achieve his goals. In some embodiments, the financial video system 22 may have a predetermined set of actions that may be designed for improving a credit score, increasing savings, and the like.

In addition, the financial video system 22 may quantify an effect to a respective credit score or account balance for an individual if the client undertakes the proposed actions. In certain embodiments, the financial video system 22 may analyze debt-to-credit ratio, debt-to-asset ratio, debt-to-income ratio, and the like to determine certain actions that may assist the client in achieving his goals. For the purposes of discussion, the present disclosure will be detailed with respect to improving a client's credit score, but it should be recognized that the embodiments described herein may be performed in relation to achieving a variety of financial goals.

In certain embodiments, the financial video system 22 may employ machine learning algorithm or observation logic to track determined actions for different credit scenarios. The machine learning algorithm may monitor the recommended actions determined by the financial video system 22 over time to identify trends and relationships between bank data, credit data, and the like with respect to recommended actions. The financial video system 22 may store the determined actions in the credit scenario database 24 along with data that describes the account data and credit data related to the scenario. In certain embodiments, the financial video system 22 may store determined actions for various credit scenarios over time to provide an index for the machine-learning algorithm to determine actions for other credit scenarios that may not be defined in the credit scenario database. For example, if the financial video system 22 identifies a credit scenario that includes account data and credit data that is within respective thresholds, the financial video system 22 may interpolate or approximate actions to perform based on the actions performed for the other identified credit scenarios. For instance, if the actions associated with the other identified credit scenarios called for the client to save an extra $10 and $20 per pay cycle, the financial video system 22 may determine an average between the two savings amounts and determine that the action will be to save an extra $15 per pay cycle.

In one embodiment, the credit provider database 18 may be organized with regard to an amount of credit score increase that the individual may desire to achieve and a list of actions that may assist the individual in achieving this improved score. As such, the financial video system 22 may query the credit provider database 18 to determine actions to recommend.

To generate personalized videos nearly instantaneously (e.g., within seconds) for a client, the financial video system 22 may use predefined animations that may be stored in a video content database 26 to generate the personalized financial video. In some embodiments, the video content database may include animations that greet the client, discuss the current financial state of the client, the goals set for the client, recommendations for the client based on the current financial state of the client, and the like. The animations may be encoded such that personal details regarding the client may be inserted into the video by accessing the credit scenario data generated by the financial video system 22, bank account data stored in the bank database 16, and credit data stored in the credit provider database 18. In addition to the animation and text effects that may be stored in the video content database 26, the video content database 26 may include audio data that may include sample audio files of certain words, phrases, and the like that may be used to generate the personalized financial video. In some embodiments, the financial video system 22 may include a voice synthesizer that may be used to generate spoken words or phrases that may be used to add personal touches to the generated video. For example, if the financial video system 22 has access to information that helps describe the individual, such as interests in sports teams, hobbies, organizations, or the like, the financial video system 22 may use the voice synthesizer to generate casual banter or a general greeting that includes a colloquial greeting with respect to the individual's greeting.

In certain embodiments, the financial service system 12, the computing device 14, the bank database 16, the credit provider database 18, the other databases 20, the financial video system 22, and the video content database 26 may be in direct communication with each other via a respective communication channel. However, it should be noted that each of the aforementioned devices may also be coupled to each other via a network. The network may be any suitable computer network that enables different electronic devices to communicate with each other, such as a collection of computing devices (e.g., servers), communication components (e.g., routers), and the like that facilitates the interconnections between the aforementioned systems and devices.

To perform some of the operations described in the present disclosure, the financial service system 12, the computing device 14, and the financial video system 22 may include certain components to facilitate these operations. With this in mind, FIG. 2 is a block diagram of example components within the financial video system 22, but it should be noted that similar components may also be included in the financial service system 12 and the computing device 14.

Figure 2:
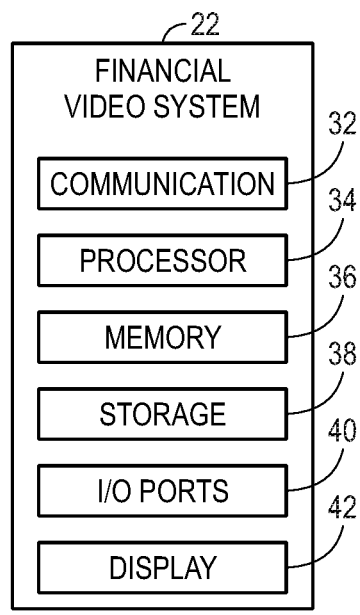
FIG. 2 illustrates a block diagram of a financial video system employed by the video generation system of FIG. 1, in accordance with embodiments described herein.

FIG. 2 is a block diagram of example components within the financial service system 12, the computing device 14, the financial video system 22, and other suitable computing devices described herein. For example, the financial video system 22 may include a communication component 32, a processor 34, a memory 36, a storage 38, input/output (I/O) ports 40, a display 42, and the like. The communication component 32 may be a wireless or wired communication component that may facilitate communication between the financial video system 22 and the other communication-enabled devices.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store the data, analysis of acquired images, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse, microphone), sensors, input/output (I/O) modules, and the like. The display 42 may operate to depict visualizations associated with software or executable code being processed by the processor 34. In one embodiment, the display 42 may be a touch display capable of receiving inputs from a user of the financial video system 22. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the financial video system 22. The display 42 may be transparent in that a user of the display 42 may look through the display 42 to see objects present in front of the user. In addition, the display 42 may present the personalized financial video generated by the financial video system 22. It should be noted that the components described above with regard to the financial video system 22 are exemplary components and the financial video system 22 may include additional or fewer components.

Figure 3:
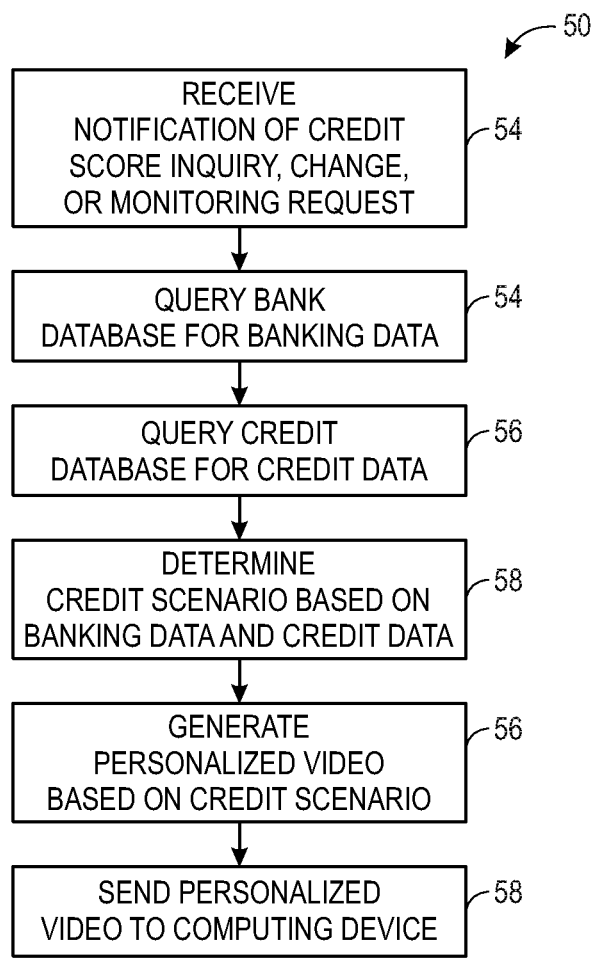
FIG. 3 illustrates a flow chart of a method for generating a personalized financial video using the financial video system, in accordance with embodiments described herein.

With the foregoing in mind, FIG. 3 illustrates a method 50 for providing a personalized financial video for individuals, in accordance with embodiments described herein. The following description of the method 50 will be discussed as being performed by the financial video system 22, but it should be understood that other computing devices described herein may perform the method 50. In addition, although the following description of the method 50 will be discussed in a particular order, it should be noted that the method 50 may be performed in any suitable order. It should also be noted that the method 50 may be performed for different clients of an organization providing the respective service. As such, each individual client may be provided a personalized video to assist the respective client to achieve respective financial goals based on his respective financial information.

Referring now to FIG. 3, at block 52, the financial video system 22 may receive a notification of a credit score inquiry, change, or monitoring request. The financial video system 22 may access the bank database 16, the credit provider database 18, and the other databases 20 at regular or irregular intervals to determine whether a request for a credit score, a change in the credit score, or a request for credit monitoring was made. In some embodiments, instead of the notification being related to a credit score, the financial video system 22 may receive a notification regarding a change in a financial status of a client. For instance, the notification may be generated when an account balance is below a threshold amount, if an expected savings amount is lower than a threshold, and the like.

In certain embodiments, the notification may be generated and sent from a computing system that monitors the financial activity or status for the client. As such, the notification may be generated by a computing system that manages the operations of a banking organization and/or the bank database 16, the operations of a credit providing organization and/or the credit provider database, and the like.

After receiving the notification, the financial video system 22 may, at block 54, query the bank database 16 for banking data related to the client. At block 56, the financial video system 22 may query the credit provider database 18 for credit data associated with the client. In certain embodiments, the financial video system 22 may analyze the banking data and the credit data to determine certain transactions, debts, or financial conditions (e.g., account hold) that may affect the credit score for the client. More specifically, the financial video system 22 may review the banking data and the credit data to identify transactions that are negatively affecting the credit score of the client. For example, the credit data may indicate that the client has not paid a certain credit bill, which has been sent to a collections agency. The financial video system 22 may use the identified transactions to generate the personalized video described below.

At block 58, the financial video system 22 may determine a credit scenario based on the banking data and the credit data. As discussed above, the credit scenario may be a set of bank account and credit account parameters that represents the financial status of the client. In some embodiments, the financial video system 22 may query the credit scenario database 24 for banking data and credit data that corresponds to the banking data and the credit data received at blocks 54 and 56. As such, the credit scenario database 24 may be organized or indexed with respect to the banking data, the credit data, a credit score, a debt amount, or the like.

In some embodiments, the credit scenario database may be indexed with respect to a desired credit score increase. A desired credit score for the client may be received by the financial video system 22 prior to the method 50, acquired via the banking data from the banking database 16, or the credit provider database 18, or the like. At block 60, the financial video system 22 may generate a personalized financial video based on the credit scenario determined at block 58. As such, the financial video system 22 may determine certain recommended actions to perform to assist the client in achieving his financial goals or increasing his credit score. For example, the financial video system 22 may query the credit scenario database 24 to identify a credit scenario that matches the determined credit scenario generated at block 58. The credit scenario database 24 may include actions performed by other individuals to improve their credit score. The actions may thus relate to the client who has similar banking data and/or credit data. By way of example, the recommended actions may include refinancing existing loans, consolidating certain debts, generating a budget for the client to pay delinquent accounts, and the like.

After determining the recommended actions, the financial video system 22 may receive generic video content via the video content database 26. As discussed above, the video content database 26 may include animation and video files that may be modified or customize the generic video to include personal details (e.g., name, financial information) that may be acquired via the bank database 16, the credit provider database 18, the other databases 20, and the like. In addition, the financial video system 22 may also add the recommended actions to the generic video. In one embodiment, generic video may include text layover that presents words that greet the client, describe the current financial state (e.g., account balance, credit score) for the client, and present the recommended actions for the client. In another embodiment, the generic video may include an animated individual that greets the client, describes the current financial state (e.g., account balance, credit score) for the client, and presents the recommended actions for the client.

In some embodiments, the personalized video content may include information related to impacts and consequences with respect to current account balances and current credit score. For example, the information may include details regarding the individual's ability to purchase a house, a vehicle, obtain employment, rent a home, and the like. In some embodiments, the video may include visualizations to illustrate how the recommended actions determined by the financial video system 22 may help the client reduce the determined impacts.

When presenting the recommended actions for assisting the individual to achieve the desired goals, the financial video system 22 may also generate links or interface components that may enable the computing device 14 to access other systems or organizations to perform the recommended actions. By way of example, after determining that the individual's goals include raising his credit score, the financial video system 22 may analyze the credit information available regarding the individual and identify any outstanding credit debts that may be affecting his credit. After identifying an outstanding credit debt, the financial video system 22 may identify an organization associated with the credit debt, retrieve contact information regarding the identified organization, and generate links or interface components that enable the individual to contact the identified organization. The interface components may include, for example, an icon that causes a computing device (e.g., mobile phone) to call the organization, an icon to cause the computing device (e.g., smart phone) to generate an email addressed to the identified organization, and the like. The financial video system 22 may embed these interface components into the personalized financial video, such that the client may select the interface components during the playback of the personalized financial video to access a website or server associated with the respective interface component.

At block 62, the financial video system 22 may send the personalized financial video to the computing device 14, which may be owned or operated by the client. In one embodiment, the financial video system 22 may send a notification to the computing device 14 that the personalized financial video has been prepared and is available for the client to view. In some embodiments, the personalized financial video may be stored in a cloud networking device, a server, or the like that may be accessible to the computing device 14. In addition, after receiving the notification regarding the personalized video, the computing device 14 may automatically open an application or automatically execute a program stored on the computing device 14 to navigate the client to view the personalized financial video.

In some embodiments, the financial video system 22 may determine a type (e.g., smartphone, laptop, tablet computer) of the computing device 14, such that the client may use or access to view the personalized financial video. The financial video system 22 may determine the type of the computing device 14 based on data stored on the databases mentioned above or retrieved via metadata stored on the computing device 14 and communicated to the financial video system 22. The financial video system 22 may use the information regarding the type of the computing device 14 to generate the personalized video that is best suited for the size and shape of the display 42 that corresponds to the computing device 14. That is, the display 42 of the computing device 14 may have a limited surface area and to effectively present the personalized financial video, the financial video system 22 may generate animations and text that may maximize the space available on the display 42 of the computing device 14.

In some embodiments, the recommended actions may include generating an account alert that notifies the client via the computing device 14 that the client's account data indicates that the client may not achieve his goal or is making purchases that will inhibit the individual's ability to achieve his goals. That is, the financial video system 22 may monitor the bank database 16 and the credit provider database 18 after performing the method 50 to determine whether the client is following the recommended actions and notify the client via the computing device 14 when the client's financial behavior alters from the recommended action. For example, the financial video system 22 may determine that the individual should keep credit spending at some threshold amount of money. When the financial video system 22 detects that the individual is within a percentage (e.g., 10%) of reaching the specified amount, the financial video system 22 may send an alert to the computing device 14 to notify him that his spending may inhibit his ability to achieve his goals. In some embodiments, the alert may be presented as a personalized financial video as described herein.

Referring back to the personalized video, in some embodiments, the financial video system 22 may also analyze the account information and recognize the actions that the individual performed that assisted the individual in achieving his goals. After the financial video system 22 identifies the actions that helped the individual to reach his goal, the financial video system 22 may generate an indication or visualization that commends the individual for performing that task and provide an indication that the respective action helped the individual get close to his goal. The indication or visualization (e.g., personalized financial video) may be transmitted to the computing device 14 and may cause the computing device 14 to open an application that presents the indication to the individual to alert the individual in a timely manner to prevent the individual from making certain financial transactions that may negatively affect the individual's ability to achieve his goals.

Figure 4:
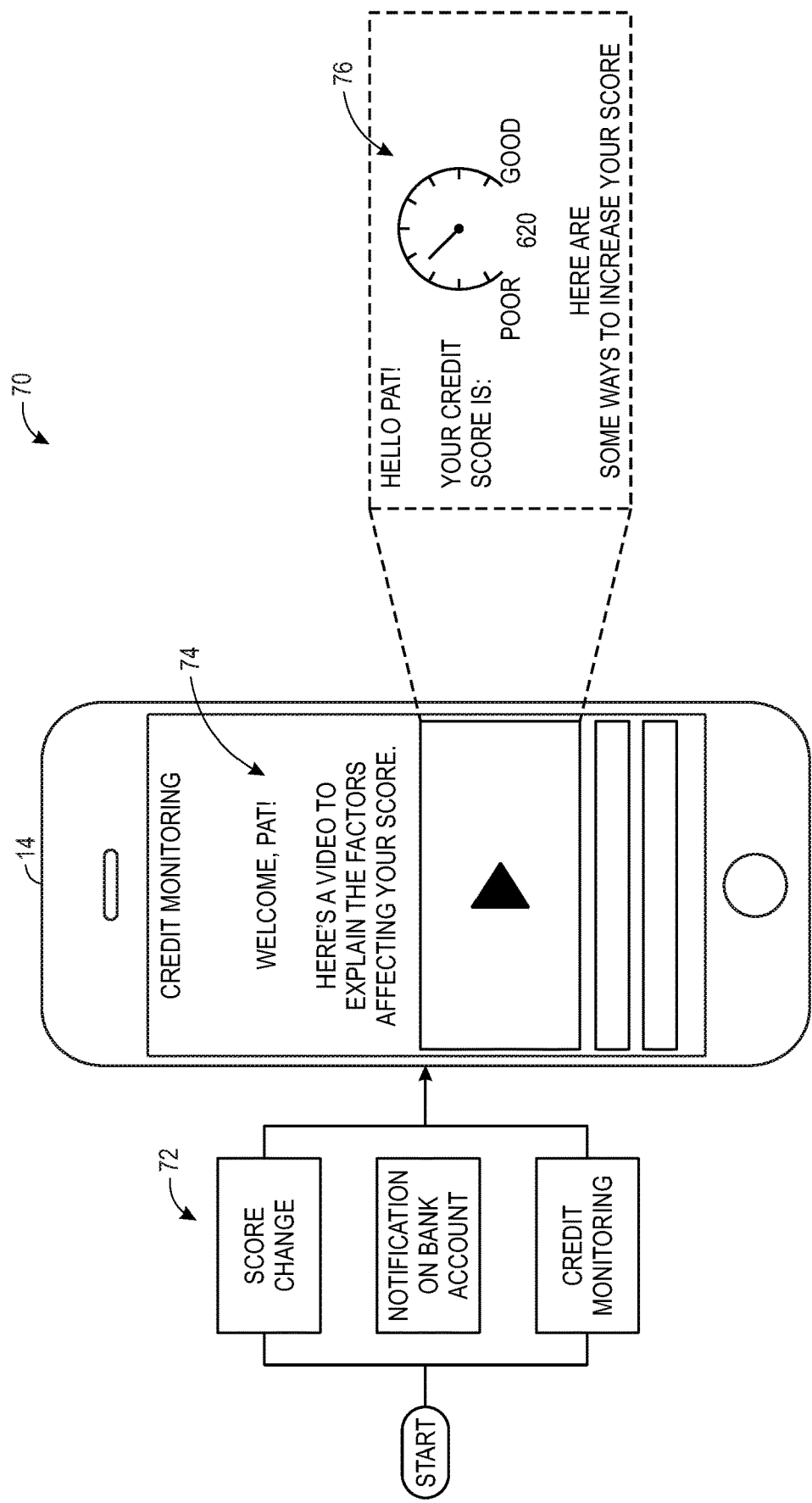
FIG. 4 illustrates a flow diagram representative of the method of FIG. 3, in accordance with embodiments described herein.

FIG. 4 illustrates a flow diagram that represents various portions of the method 50 described above. As discussed above with respect to block 52, the financial video system 22 may initiate the method 50 based on conditions 72. As discussed above, the conditions 72 may include detecting a credit score change, receiving a notification regarding a bank account, receiving a request for credit monitoring, and the like. After the financial video system 22 generates the personalized financial video, the computing device 14 may receive a notification 74 that may present a link or interface component to access the personalized financial video. After receiving an input at the link or interface component, the computing device 14 may access the personalized financial video and play a video 76 via the display 42 of the computing device 14. As shown in the example video 76 of FIG. 4, the video 76 may include a personal greeting, an indication of an individual's respective credit status (e.g., or bank status), along with an introduction to recommended actions to improve the respective credit status.

By providing a personalized video that summarizes the individual's account status and provides analysis on how to reach the individual's goals, the financial video system 22 may more effectively communicate and educate the individual in how to achieve his goals. In addition, by generating actionable items that may be interacted with via an input device, the system may assist the individual in reinforcing spending habits that may assist the individual in achieving his goals.

Although the foregoing discussion is described with regard to generating a video, it should be noted that the video may include audio that addresses the individual by name and describes the visualizations presented via the video. The audio may be associated with each visualization and may also be generated for the individual.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A computer system for generating video content, comprising:
   a bank database comprising a first set of data associated with an account status of an individual;
   a credit provider database comprising a second set of data associated with a credit status of the individual;
   at least one computer processor configured to:
      receive an indication that the credit status of the individual has changed from a computing system associated with a credit authority;
      retrieve the first set of data from the bank database and the second set of data from the credit provider database;
      identify at least two credit scenarios from a database comprising a plurality of credit scenarios based on the first set of data and the second set of data, wherein each credit scenario of the plurality of credit scenarios is associated with a first respective set of account data and a second respective set of credit data, and wherein the at least two credit scenarios are identified based on one or more relationships between the first set of data, the second set of data, the first respective set of account data, and the second respective set of credit data;
      determine at least two savings amounts per bill pay cycle based on the at least two credit scenarios;
      determine an average of the at least two savings amounts;
      generate a personalized financial video associated with the individual based on the average of the at least two savings amounts to improve the credit status of the individual;
      identify outstanding credit debt associated with the credit status of the individual based on the first set of data and the second set of data;
      identify one or more organizations associated with the outstanding credit debt;
      generate one or more website links configured to access one or more computing systems corresponding to the one or more organizations associated with the outstanding credit debt;
      embed the one or more website links into the personalized financial video; and
      transmit the personalized financial video comprising the one or more website links to a computing device associated with the individual, wherein the computing device is configured to automatically play the personalized financial video upon receipt, wherein the one or more website links are represented as one or more graphical icons superimposed within the personalized financial video, and wherein the one or more graphical icons are configured to receive one or more inputs from the individual while the personalized financial video is being played via the computing device, and wherein in response to receiving the one or more inputs, the computing device is configured to communicatively couple to the one or more computing systems via the one or more website links, and navigate to one or more websites that correspond to the one or more website links.

2. The computer system of claim 1, wherein the first set of data comprises identification information, and wherein the personalized financial video comprises a greeting based on the identification information.

3. The computer system of claim 1, wherein a credit scenario database is indexed with respect to a credit status increase.

4. The computer system of claim 1, wherein the personalized financial video comprises an animation configured to greet the individual, present a current financial status based on the first set of data and the second set of data, present one or more actions configured to assist the individual to achieve a financial goal, or any combination thereof.

5. The computer system of claim 4, wherein the at least one computer processor is configured to:
   monitor the first set of data and the second set of data after transmitting the personalized financial video to the computing device; and
   send a notification indicative of the individual performing an action that will inhibit the individual in achieving a financial goal associated with the personalized financial video based on the monitored first set of data or the monitored second set of data.

6. A non-transitory computer-readable medium comprising computer-executable instructions that, when executed by at least one computer processor, are configured to cause the at least one computer processor to:
   receive an indication associated with a credit status change of an individual from a computing system associated with a credit authority;
   query a bank database for a first set of data associated with an account status of the individual;
   query a credit provider database for a second set of data associated with the credit status of the individual;
   identify at least two credit scenarios from a database comprising a plurality of credit scenarios based on the first set of data and the second set of data, wherein each credit scenario of the plurality of credit scenarios is associated with a first respective set of account data and a second respective set of credit data, and wherein the at least two credit scenarios are identified based on one or more relationships between the first set of data, the second set of data, the first respective set of account data, and the second respective set of credit data;
   determine at least two savings amounts per bill pay cycle based on the at least two credit scenarios;
   determine an average of the at least two savings amounts;
   generate a personalized financial video comprising one or more animations configured to convey the average of the at least two savings amounts to improve the credit status of the individual;
   identify outstanding credit debt associated with the credit status of the individual based on the first set of data and the second set of data;

identify one or more organizations associated with the outstanding credit debt;

generate one or more website links configured to access one or more computing systems corresponding to the one or more organizations associated with the outstanding credit debt;

embed the one or more website links into the personalized financial video; and send a notification to a computing device associated with the individual, wherein the notification is configured to enable the computing device to access the personalized financial video comprising the one or more website links to the computing device associated with the individual, wherein the computing device is configured to automatically play the personalized financial video upon receipt, wherein the one or more website links are represented as one or more graphical icons superimposed within the personalized financial video, and wherein the one or more graphical icons are configured to receive one or more inputs from the individual while the personalized financial video is being played via the computing device, and wherein in response to receiving the one or more inputs, the computing device is configured to communicatively couple to the one or more computing systems via the one or more website links, and navigate to one or more websites that correspond to the one or more website links.

7. The non-transitory computer-readable medium of claim 6, wherein the first set of data comprises information related to one or more account balances, one or more spending trends, one or more deposit amounts, income, one or more debts, one or more mortgages, or any combination thereof.

8. The non-transitory computer-readable medium of claim 6, wherein the second set of data comprises an available credit line, credit score, one or more outstanding debts, or any combination thereof.

9. The non-transitory computer-readable medium of claim 6, wherein the at least one computer processor is configured to generate the personalized financial video based on a third set of data accessed via a video content database, wherein the third set of data comprises one or more animations configured to be encoded with identification information for the individual.

10. The non-transitory computer-readable medium of claim 6, wherein the one or more animations is configured to present one or more interests associated with the individual.

11. The non-transitory computer-readable medium of claim 6, wherein the at least one computer processor is configured to:
retrieve a third set of data from an additional database comprising a collection of information from one or more electronic news sources; and
generate the personalized financial video based on the first set of data, the second set of data, and the third set of data.

12. The non-transitory computer-readable medium of claim 11, wherein the third set of data comprises information associated with an economy, one or more interest rates, one or more stock market prices, or any combination thereof.

13. A method for generating a video, comprising:
receiving, via at least one computer processor, an indication associated with a credit status change of an individual from a computing system associated with a credit authority;

querying, via the at least one computer processor, a bank database for a first set of data associated with an account status of the individual;

querying, via the at least one computer processor, a credit provider database for a second set of data associated with the credit status of the individual;

identifying at least two credit scenarios from a database comprising a plurality of credit scenarios based on the first set of data and the second set of data, wherein each credit scenario of the plurality of credit scenarios is associated with a first respective set of account data and a second respective set of credit data, and wherein the at least two credit scenarios are identified based on one or more relationships between the first set of data, the second set of data, the first respective set of account data, and the second respective set of credit data;

determining at least two savings amounts per bill pay cycle based on the at least two credit scenarios;

determining an average of the at least two savings amounts;

generating, via the at least one computer processor, a personalized financial video comprising one or more animations configured to convey the average of the at least two savings amounts to improve a credit status of the individual;

identifying outstanding credit debt associated with the credit status of the individual based on the first set of data and the second set of data;

identifying one or more organizations associated with the outstanding credit debt;

generating one or more website links configured to access one or more computing systems corresponding to the one or more organizations associated with the outstanding credit debt;

embedding the one or more website links into the personalized financial video; and sending, via the at least one computer processor, a notification to a computing device associated with the individual, wherein the notification is configured to enable the computing device to access the personalized financial video comprising the one or more website links to the computing device associated with the individual, wherein the computing device is configured to automatically play the personalized financial video upon receipt, wherein the one or more website links are represented as one or more graphical icons superimposed within the personalized financial video, and wherein the one or more graphical icons are configured to receive one or more inputs from the individual while the personalized financial video is being played via the computing device, and wherein in response to receiving the one or more inputs, the computing device is configured to communicatively couple to the one or more computing systems via the one or more website links, and navigate to one or more websites that correspond to the one or more website links.

14. The method of claim 13, comprising storing, via the at least one processor, the personalized financial video in one or more servers configured to communicatively couple to the computing device.

15. The method of claim 13, wherein the personalized financial video comprises audio configured to greet the individual.

16. The method of claim 13, comprising determining, via the at least one processor, the average of the at least two savings amounts based on a machine learning algorithm.

17. The computer system of claim 1, wherein the second set of data comprises an available credit line, credit score, one or more outstanding debts, or any combination thereof.

18. The computer system of claim 1, wherein the at least one computer processor configured to:
   determine a new credit scenario corresponding to the average of the at least two savings amounts for the personalized financial video; and
   store the new credit scenario in the database.

19. The computer system of claim 1, wherein the first set of data comprises information related to one or more account balances, one or more spending trends, one or more deposit amounts, income, one or more debts, one or more mortgages, or any combination thereof.

20. The method of claim 13, comprising:
   determining a new credit scenario corresponding to the average of the at least two savings amounts determined for the personalized financial video; and
   storing the new credit scenario in the database.

* * * * *